United States Patent [19]
Takahashi et al.

[11] Patent Number: 4,941,854
[45] Date of Patent: Jul. 17, 1990

[54] BOARDING SENSOR AND CONTROLLER FOR SMALL WATERCRAFT

[75] Inventors: Hideharu Takahashi; Yoshiaki Uchida, both of Hamamatsu, Japan

[73] Assignee: Sanshin Kogyo Kabushiki Kaisha, Hamamatsu, Japan

[21] Appl. No.: 276,065

[22] Filed: Nov. 25, 1988

[30] Foreign Application Priority Data

Nov. 27, 1987 [JP] Japan .................................. 62-297827
May 23, 1988 [JP] Japan .................................. 63-123954

[51] Int. Cl.⁵ ........................ B60K 28/00; B63H 19/00
[52] U.S. Cl. ........................................ 440/1; 180/272; 114/270
[58] Field of Search ..................... 114/270, 343; 440/1, 440/2, 38; 441/80; 340/573, 556, 984; 181/123; 180/272

[56] References Cited

U.S. PATENT DOCUMENTS

| | | | |
|---|---|---|---|
| 3,807,343 | 4/1974 | Peebles | 440/1 |
| 4,022,146 | 5/1977 | Sadler | 440/1 |
| 4,630,205 | 12/1986 | Otaka | 440/1 |
| 4,743,213 | 5/1988 | Nishida | 440/1 |
| 4,759,731 | 7/1988 | Uchida et al. | 440/1 |
| 4,823,367 | 4/1989 | Kreutzfeld | 340/556 |

FOREIGN PATENT DOCUMENTS 0099423  7/1980  Japan .................................. 180/272

Primary Examiner—Sherman D. Basinger
Assistant Examiner—Edwin L. Swinehart
Attorney, Agent, or Firm—Ernest A. Beutler

[57] ABSTRACT

A boarding sensor and control circuit for small watercraft providing a reflection sensor which outputs a non-boarding signal to the control circuit when the driver is not within the reflection sensor's detection area and, in one embodiment, directs the navigation of the watercraft to return to the driver when overboard.

18 Claims, 6 Drawing Sheets

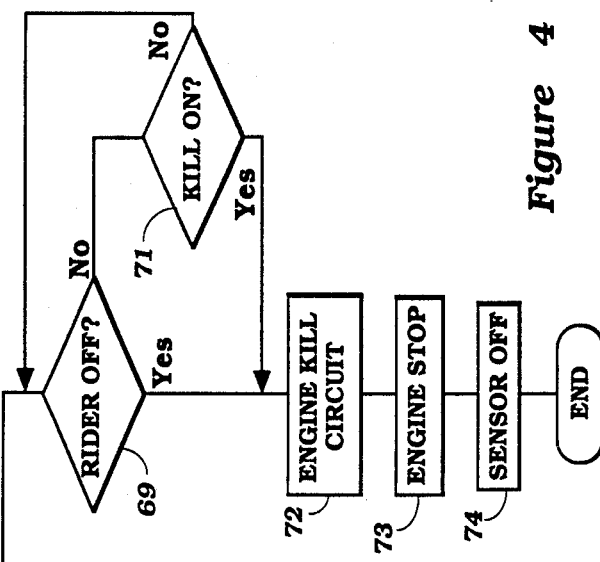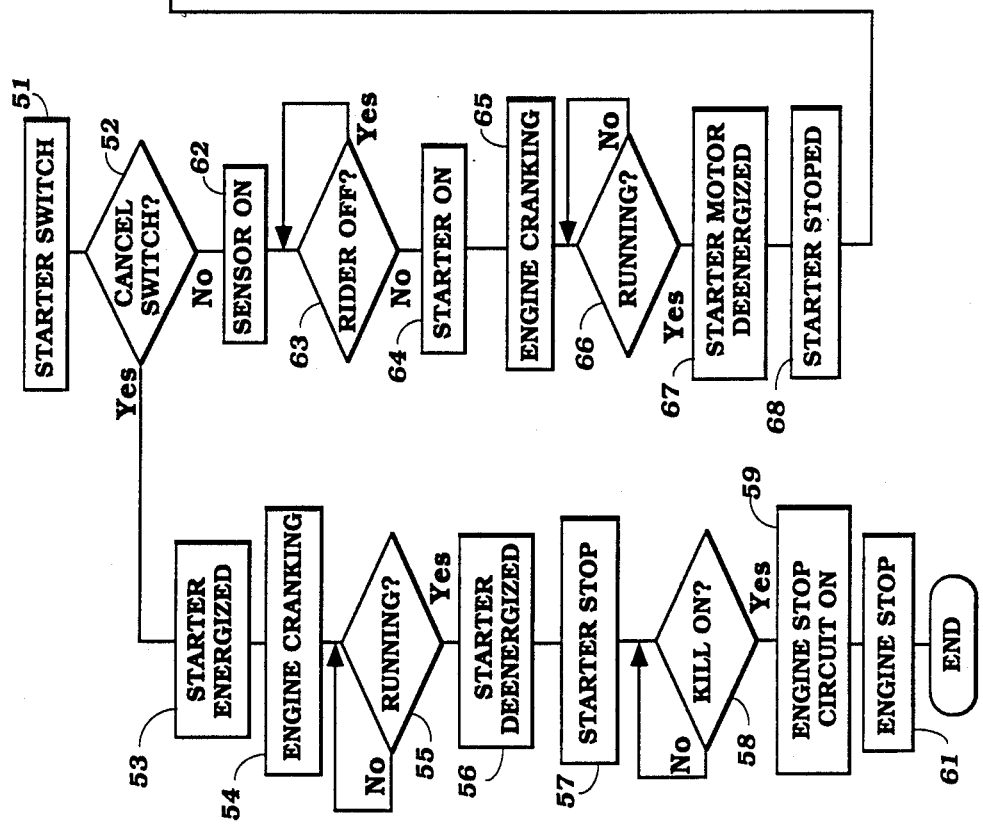
Figure 4

BOARDING SENSOR AND CONTROLLER FOR SMALL WATERCRAFT

BACKGROUND OF THE INVENTION

This invention relates to a boarding sensor and control for a small watercraft and more particularly concerns a reflection sensor which detects when the driver has fallen overboard and a control that regulates the navigation of the watercraft in that situation.

A popular form of small watercraft embodies a jet propulsion unit for powering the watercraft and is designed primarily to be ridden by a single rider. This type of watercraft is highly maneuverable and offers great entertainment. During the operation of the watercraft, the driver may fall overboard and leave the watercraft driverless due to the sporting nature of the watercraft. Mechanical overboard sensors have been provided to prevent a small watercraft from running driverless under such conditions. One such mechanical sensor provides a kill switch which is activated when a locking plate is removed from the switch. The locking plate is attached to a length of cord which is affixed to the driver's wrist. When the driver falls overboard, the locking plate is pulled out of the kill switch, engaging the kill switch and stopping the engine.

Although such devices are effective for the intended purposes, when the driver wishes to restart the watercraft after falling overboard, he would have to board the watercraft, insert the lockplate back into the kill switch, thus disengaging the kill switch, and then restart the engine. This system offers some disadvantages. Moreover, the shock of the driver hitting the water could release the cord from the driver's wrist, causing the driver to lose the lockplate and prevent the driver from restarting the watercraft. Alternatively, if the operator forgets to bring the lock plate with him, then he will not be able to ride the watercraft.

It is, therefore, an object of this invention to provide a safe and reliable boarding sensor and control means for a small watercraft to prevent the craft from running driverless and not inpair the driver's enjoyment of the watercraft.

It is another object of this invention to provide a boarding sensor for a small water craft which does not require the driver to come into contact with the boarding sensor for it to be operational.

Although the prior art type of devices are operative to stop the engine of the watercraft when the rider falls overboard, the watercraft may actually travel some way away from the rider before it actually stops its motion. If the rider has somehow been injured, it may be difficult for him to reach and reboard the watercraft.

It is, therefore a further object of this invention to provide a control for a small watercraft that will cause the watercraft to return to the rider if he falls overboard.

SUMMARY OF THE INVENTION

According to the present invention, a boarding sensor and a control means are provided for a small watercraft which prevent the watercraft from running driverless. The boarding sensor comprises a reflection sensor which sends out a reflected signal within a detection area normally occupied by the driver of the watercraft. The reflection sensor then receives the reflected signal from the driver. If the reflection sensor does not receive a reflected signal, the reflection sensor outputs a non-boarding signal to the control means, which then regulates the watercraft.

BRIEF DESCRIPTION OF THE DRAWINGS

FIG. 4 is a flow chart showing a first control procedure for the boarding sensor and control means.

DETAILED DESCRIPTION OF THE PREFERRED EMBODIMENTS OF THE INVENTION

Figure 1:
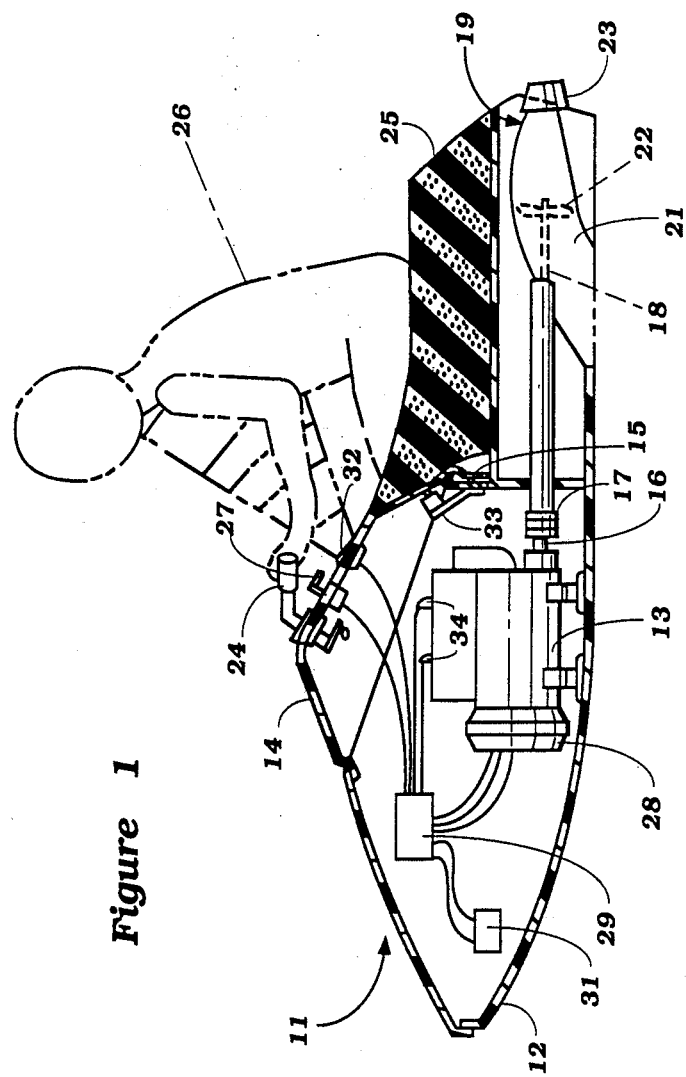
FIG. 1 is a side elevational view of a small watercraft constructed in accordance with a first embodiment of the invention.
Figure 2:
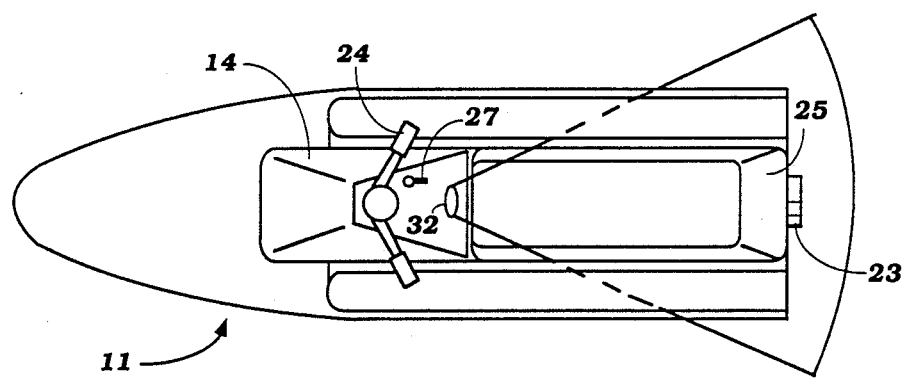
FIG. 2 is a top plan view of the watercraft.

Referring first to the embodiment of FIGS. 1 and 2, a small watercraft constructed in accordance with this embodiment of the invention is identified generally by the reference numeral 11. The small watercraft 11 is comprised of a hull 12 in which an engine 13 is positioned beneath a removable hatch cover 14. The hatch cover 14 is held in place by means of a latching mechanism 15 so as to afford access to the engine 13 for servicing and other purposes.

The engine 13 drives an output shaft 16 which is connected by means of a flexible coupling 17 to an impeller shaft 18 of a jet propulsion unit, indicated generally by the reference numeral 19. The jet propulsion unit 19 includes an internal duct 21 in which an impeller 22 is supported. The impeller 22 is coupled to the impeller shaft 18 to be driven by it for propelling the watercraft 11 through the water in a known manner. The water discharge from the propulsion unit 19 is discharged through a pivotally supported steering nozzle 23. The steering nozzle 23 is coupled to a handlebar assembly 24 for steering of the watercraft 11 in a known manner.

The hull 12 is provided with a rearwardly positioned seat 25 that is adapted to accommodate a single rider seated in straddle fashion as shown in phantom at 26. The seat 25 is positioned immediately to the rear of the handlebar 24 and a combined engine starter control and kill switch 27 is positioned in proximity to the handlebar 24 so as to permit starting of the engine 13 and also stopping of it by the operator 26.

The engine 13 is provided with an electrical system comprised of a starter and generator 28, a control box 29 and a powering battery 31. The construction as thus far described may be considered to be conventional and, for that reason, further description of the watercraft is not necessary to understand the construction and operation of the invention.

The watercraft 11 is provided with a non-contact type of sensing device which will sense when the operator 26 is not present in the seat 25 and will provide an appropriate control, of one of the types hereinafter described. To this end, there is provided in this embodiment an ultrasonic transmitter receiver sensor mechanism 32 that is positioned on the removable cowling portion 14 and emits sound waves as shown in FIG. 1 to the area normally occupied by the rider 26. The presence of absence of reflected sound waves is transmitted to the control box 29 to provide control for the watercraft 11, as will hereinafter be described.

There is also provided a hatch cover sensing switch 33 which senses when the hatch cover 14 is in place and latched by the latching mechanism 15.

The engine 13 is of the spark ignited type and includes spark plugs 34 that are fired by the control device 29 in a known manner.

Figure 3:
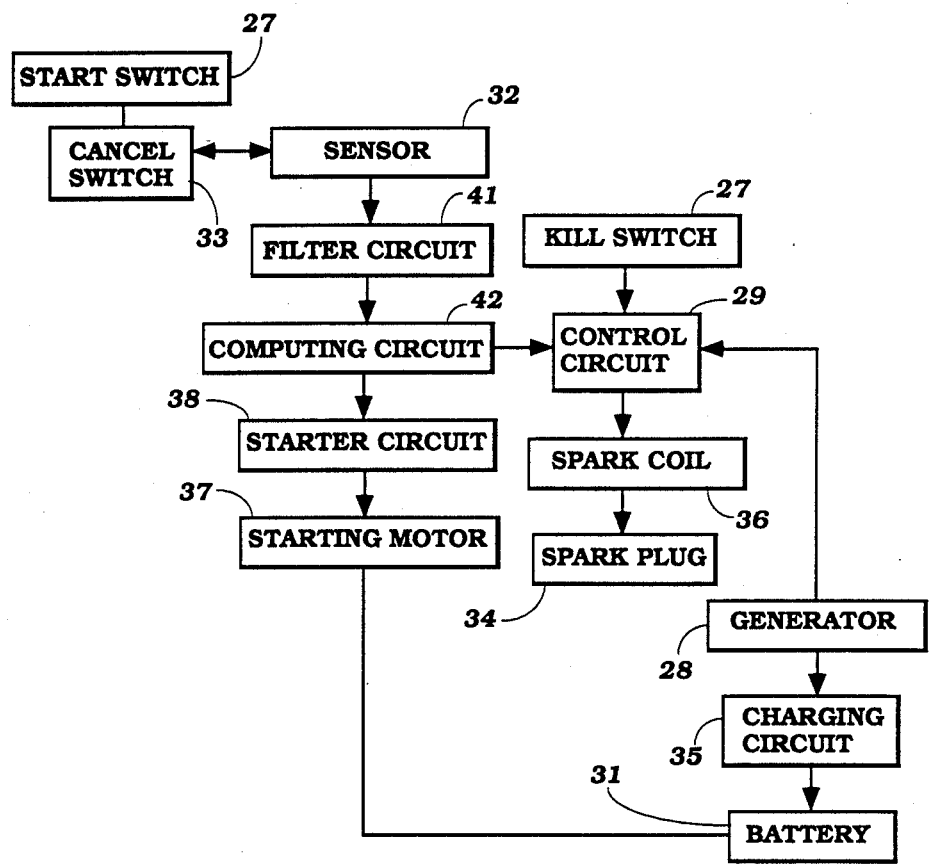
FIG. 3 is a block diagram showing the component of the boarding sensor and control means.

FIG. 3 shows the relationship of the various components. It will be seen that the generator 28 has a charging circuit 35 which charges the battery 31 and provides the electrical power for the system. In addition, the kill portion of the switch 27 operates the control circuit 29 to energize spark coils 36 to fire the spark plugs 34 in a known manner. A starter motor 37 is operated by a starter circuit 38 that is operated by the start portion of the switch 27 through the switch 33. In addition, the sensor 32 outputs its signals through a filter circuit 41, for filtering noise from the system, to a computer circuit 42 which provides signals to both the starter circuit 38 and control circuit 29.

One routine of logic by which the system may operate is illustrated in FIG. 4 and reference may now be had to that figure to show how the sensor 32 operates to control the watercraft. In the routine shown in FIG. 4, the engine will be stopped if the sensor 32 indicates that the rider is overboard. Under this condition, it also will not be possible to start the engine when the rider is not seated in the seated area. However, there is a circumstance wherein the engine may be started for service purposes when the engine cover is removed and the rider is not in place on the seat 25. Under this condition, then the engine can be started for service purposes.

Turning now to FIG. 4 and the routine therein, the routine is started at the step 51 by the operation of the starter switch 27. When the starter switch 27 is operated, the program moves to the step 52 wherein it is determined if the hatch cover sensing switch 32 has indicated that the hatch cover 14 is removed. If it is removed, the program assumes that the engine is being started for servicing purposes and the program moves to the step 53 so as to energize the starter motor. The engine then cranks at the step 54 and at the step 55. The control circuit 29 determines if the engine is running. If the engine is not running, the cranking continues.

If at the step 55 it is determined that the engine is running, at the step 56 the starter is deenergized and at the step 57 the starter will actually stop. Then the program moves to the step 58 where the condition of the kill switch 27 is determined. Assuming that the kill switch is not turned on to stop the engine, the program repeats. If, however the operator wishes to stop the engine, the kill switch is turned on and the program moves to the step 59 where the control circuit 29 is energized so as to stop the engine by discontinuing the firing of the spark plugs 34. Then at the step 61 the engine stops.

If the engine cover is determined to be in place at the step 52, the program moves to the step 62 so as to energize the ultrasonic sensor 32 when the starter switch 51 is turned on. The program then moves to the step 63 so as to determine if the rider is off of the seat 25. If the rider is off of the seat for a predetermined time interval, such as one second, the program continues to repeat and sense if the rider is in place. If, however, the rider is not off of the seat and the sensor 32 is receiving signals, the program moves to the step 64 so as to energize the starter. The engine is then cranked at 65 and at the step 66 it is determined if the engine is running. If it is not, the cranking continues.

If, however, the engine is determined at the step 66 to be running, the program moves to the step 67 to deenergize the starter and the starter stops at the step 68. The program then continues at the step 69 to determine if the rider is on or off of the seat 25. If the rider is not off, the program moves to the step 71 wherein the engine may be stopped manually by turning the kill switch on when the rider desires. If, however, the rider is determined at the step 69 to be off, the kill circuit is energized automatically at the step 72 and the engine stops at the step 73. The sensor 32 is then turned off at the step 74.

Figure 5:
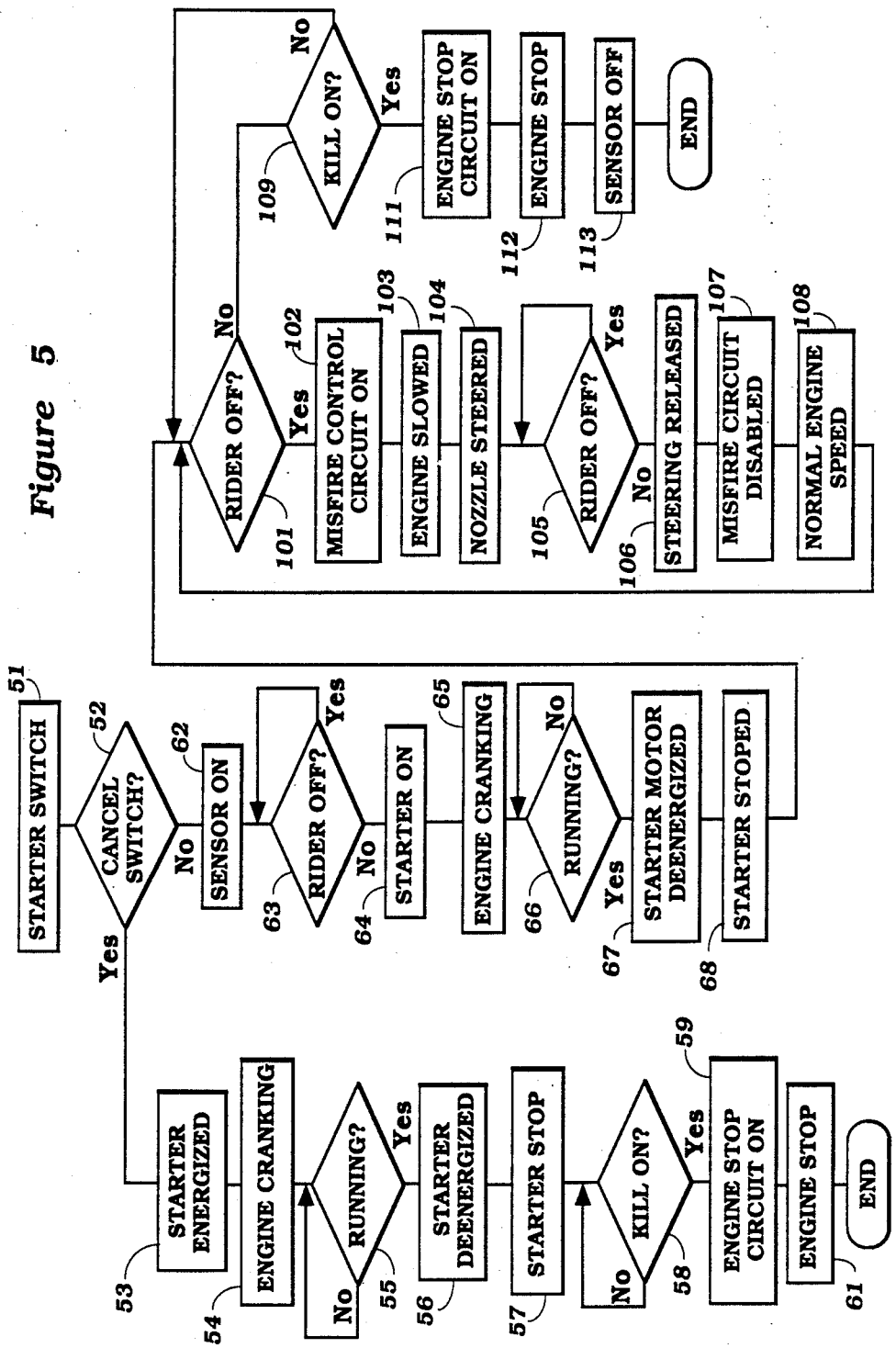
FIG. 5 is a flow chart showing another embodiment of the control procedure for the boarding sensor and control means.

FIG. 5 shows another routine that may be practiced with the construction shown in FIGS. 1 through 3. In this routine, rather than killing the engine in response to the rider being overboard, the engine is slowed and the steering nozzle 23 is turned on an extreme position so that the watercraft 11 will encircle the vicinity where the rider has been thrown overboard. In this routine, all of the steps from the step 51 through the step 68 are the same as the routine of FIG. 4 and, for that reason, it is not believed to be necessary to repeat the description of these steps.

However, after the engine is running and the rider has been on board, there is a determination made at the step 101 as to whether or not the rider has fallen overboard. Again, this is sensed by a delay in reflective signals for a predetermined time period, such as one second. If the rider has been thrown overboard, the routine moves to a step 102 wherein a misfire circuit is enabled so as to periodically interrupt the firing of the spark plugs 34 and thus reduce the speed of the engine at the step 103. Any of the known circuits employed for this purpose may be utilized and since the circuit per se forms no part of the invention, it is not believed necessary to illustrate or describe it.

Once the engine slowing has been initiated, the steering nozzle 23 is then moved by a suitable servo motor or baffle at the step 104 so as to place the watercraft 11 in a circling mode. The routine then moves to the step 105 to continue to determine if the rider is off. If the rider continues to be off the watercraft, the aforenoted condition will remain in effect. However, if the rider does reboard as determined at the step 105, the steering is released at the step 106 and the misfire circuit is disabled at the step 107 so that the engine can return to normal engine control at the step 108.

If the rider is not determined to be off the boat at the step 101, the operator can still stop the engine by operating the kill switch as shown at the step 109 wherein the engine stop circuit is enabled at the step 111 and the engine will stop at the step 112. The sensor 32 is then turned off at the step 113.

Figure 6:
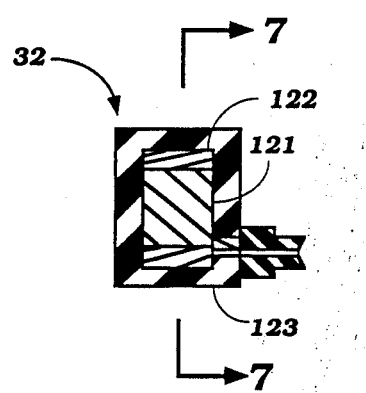
FIG. 6 is a cross-sectional view showing the construction of the reflective sensor.
Figure 7:
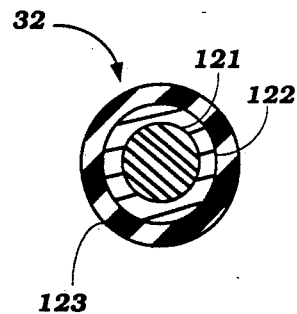
FIG. 7 is a cross-sectional view taken along the line 7—7 of FIG. 6.
Figure 8:
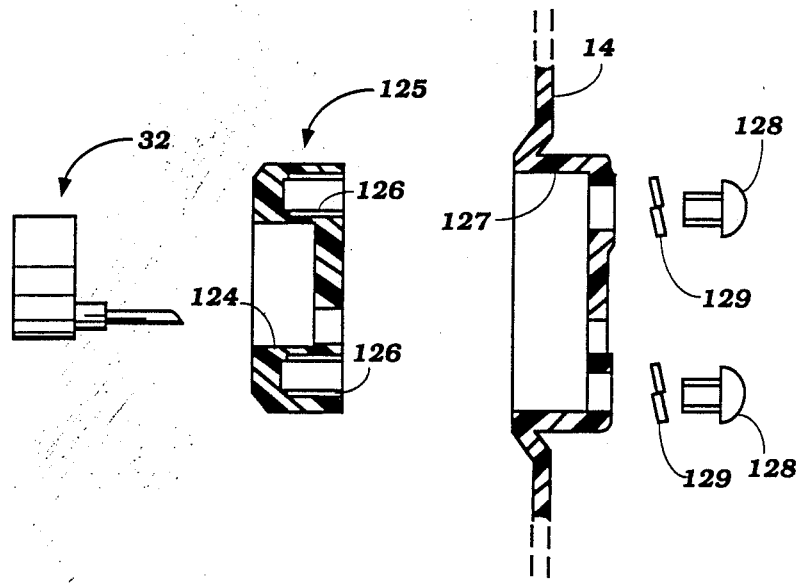
FIG. 8 is an exploded cross-sectional view showing the mounting of sensor.

FIGS. 6 through 8 show the detail of the sensor 32 and its mounting although it is to be understood that various types of constructions may be employed. Referring to these figures, it will be noted that the sensor 32 is comprised of an armature 121 that is surrounded by a winding 122 and encased within a protective material 123. The sensor 32 is then mounted within a pocket 124 of a mounting elastomeric member 125 which is, in turn, formed with a pair of threaded openings 126. The mounting element, 125 is, in turn, mounted in a recess 127 in the hatch cover 14 by means of bolts 128 and lock washers 129.

Figure 9:
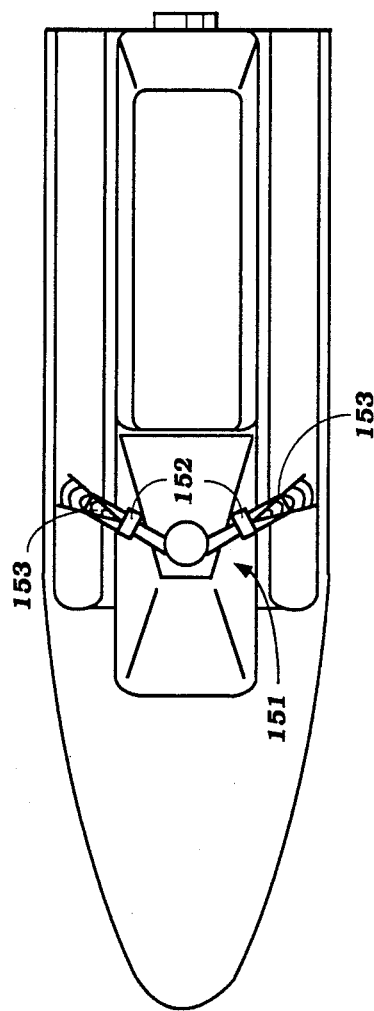
FIG. 9 is a top plan view of a small watercraft constructed in accordance with another embodiment of the invention.

In the embodiments of the invention thus far described, the sensor construction has been an ultrasonic sensor. It is to be understood, however, that light type sensors may also be employed in which light is emitted and reflected back by the operator when in position to provide the on board signal. FIG. 9 shows such a light sensor which is indicated generally at the reference numeral 151. In this embodiment, the handlebars 152 are each provided with light emitting and receiving sensor detectors 153. The detectors 153 will sense when a rider's hands are not present on the handlebars 152. In the event both sensors 153 output a signal indicating an absence of the rider's hand for a predetermined time period, such as the one second previously noted, the watercraft can be controlled by one of the routines already described.

It should be readily apparent from the foregoing description that several embodiments of the invention have been illustrated and described, each of which indicates when the rider is overboard and will control the watercraft in response to such a condition.

We claim:

1. A boarding sensor and control means for small watercraft powered by an engine and having a steering mechanism wherein said boarding sensor comprises a reflection sensor which outputs a non-boarding signal to said control means when a driver is not within a detection area of said reflection sensor and said control means regulates navigation of said watercraft by decelerating said engine to an idle and being adapted to operate said watercraft steering mechanism to return said watercraft to a fallen driver.

2. A boarding sensor and control means as set forth in claim 1 wherein said small watercraft has an engine cover over said engine and said reflection sensor is by-passed when said engine cover is removed for enabling said engine to be started without said driver within said detection area.

3. A boarding sensor and control means as set forth in claim 1 wherein said reflection sensor comprises an ultrasonic sensor which emits ultrasonic waves and receives reflected ultrasonic waves.

4. A boarding sensor and control means as set forth in claim 1 wherein said reflection sensor comprises a light sensor which emits light waves and receives reflected light waves.

5. A boarding sensor and control means as set forth in claim 1 wherein the steering mechanism comprises a handle bar having a pair of steering handle grips and reflection sensors are mounted on each of said steering handle grips.

6. A boarding sensor and control means for small watercraft having an engine and a hatch cover for said engine and wherein said boarding sensor comprises a reflection sensor which outputs a non-boarding signal to said control means when a driver is not within a detection area of said reflection sensor and said control means regulates navigation of said watercraft and means for bypassing said reflection sensor when said engine hatch cover is removed enabling said engine to be started without said driver within said detection area.

7. A boarding sensor and control means as set forth in claim 6 wherein said control means stalls the engine when receiving non-boarding output signal from said reflection sensor.

8. A boarding sensor and control means as set forth in claim 6 wherein said control means decelerates said engine to an idle when receiving said reflection sensor's non-boarding signal and direct the steering mechanism of said watercraft to return said watercraft to a fallen driver.

9. A boarding sensor and control means as set forth in claim 6 wherein said reflection sensor is activated by said watercraft's starter switch closing operation for its internal combustion engine.

10. A boarding sensor and control menas as set forth in claim 6 wherein said reflection sensor comprises an ultrasonic sensor which emits ultrasonic waves and receives reflected ultrasonic waves.

11. A boarding sensor and control means as set forth in claim 6 wherein said reflection sensor comprises a light sensor which emits light waves and receives reflected light waves.

12. A boarding sensor and control means for small watercraft having a steering mechanism, an engine and an engine cover and wherein said boarding sensor comprises a reflection sensor means which outputs a non-boarding signal to said control circuit means when a driver is not within a detection area of said reflection sensor means and said control means regulates navigation of said watercraft, said steering mechanism comprising a handle bar having a pair oif steering hand grips and said reflection sensor means comprising a pair of reflection sensors each mounted on a repective one of said steering handle grips.

13. A boarding sensor and control means as set forth in claim 12 wherein said control means stalls the engine when receiving non-boarding output signal from said reflection sensor means.

14. A boarding sensor and control means as set forth in claim 12 wherein said control means decelerates said engine to an idle when receiving said reflection sensor means' non-boarding signal and directs said watercraft steering mechanism to return said watercraft to fallen driver.

15. A boarding sensor and control means as set forth in claim 12 wherein said reflection sensor means is activated by said watercraft's starter switch closing operation for the engine.

16. A boarding sensor and control means as set forth in claim 15 wherein said reflection sensor means is by-passed when said engine cover is removed enabling said engine to be started without said driver within said detection area.

17. A boarding sensor and control means as set forth in claim 12 wherein said reflection sensor means comprises an ultrasonic sensor which emits ultrasonic waves and receives reflected ultrasonic waves.

18. A boarding sensor and control means as set forth in claim 12 wherein said reflection sensor means comprises a light sensor which emits light waves and receives reflected light waves.

* * * * *

UNITED STATES PATENT AND TRADEMARK OFFICE
CERTIFICATE OF CORRECTION

PATENT NO. : 4,941,854
DATED : July 17, 1990
INVENTOR(S) : Takahashi, et al It is certified that error appears in the above-identified patent and that said Letters Patent is hereby corrected as shown below:

Column 6, line 18, Claim 10, "menas" should be --means--.

Column 6, line 30, Claim 12, delete "circuit".

Column 6, line 34, Claim 12, "oif" should be --of--.

Column 6, line 36, Claim 12, "repective" should be --respective--.

Signed and Sealed this

Nineteenth Day of January, 1993

Attest:

DOUGLAS B. COMER

Attesting Officer     Acting Commissioner of Patents and Trademarks